United States Patent
Tau et al.

(10) Patent No.: US 8,154,526 B2
(45) Date of Patent: Apr. 10, 2012

(54) TOUCH SCREEN DISPLAY DEVICE AND APPLICATION THEREOF

(75) Inventors: Yi-Wei Tau, Taipei Hsien (TW);
Chu-Chia Tsai, Taipei Hsien (TW);
Hung-Young Hsu, Taipei Hsien (TW);
Chang-Chih Han, Taipei Hsien (TW);
Tsun-Chih Yang, Taipei Hsien (TW);
Wen-Chin Wu, Taipei Hsein (TW)

(73) Assignee: Wistron Corp., Hsichih, Taipei Hsien (TW)

( * ) Notice: Subject to any disclaimer, the term of this patent is extended or adjusted under 35 U.S.C. 154(b) by 700 days.

(21) Appl. No.: 12/277,006

(22) Filed: Nov. 24, 2008

(65) Prior Publication Data
US 2010/0007614 A1 Jan. 14, 2010

(30) Foreign Application Priority Data
Jul. 8, 2008 (TW) ............................. 97125783 A

(51) Int. Cl.
*G06F 3/041* (2006.01)
(52) U.S. Cl. ...................................................... 345/173
(58) Field of Classification Search .................... None
See application file for complete search history.

(56) References Cited

U.S. PATENT DOCUMENTS

| 6,728,519 | B1 * | 4/2004 | Okuda | 455/90.3 |
| 7,126,071 | B1 | 10/2006 | Yang et al. | |
| 2008/0278355 | A1 * | 11/2008 | Moore et al. | 341/33 |
| 2009/0315837 | A1 * | 12/2009 | Geiger | 345/173 |

\* cited by examiner

*Primary Examiner* — Andrew L Sniezek
(74) *Attorney, Agent, or Firm* — Muncy, Geissler, Olds & Lowe, PLLC

(57) ABSTRACT

A touch screen display device is provided. The touch screen display device includes a touch screen, a sensor, a control element and a sensitivity-setting element. The sensor is configured to detect if the touch screen display device is being inserted in a connection chamber. The control element is electrically connected with the sensor and is configured to generate a control signal according to an insertion status of the touch screen display device. The sensitivity-setting element is configured to set the touch screen to a first sensitivity or a second sensitivity according to the control signal. The touch screen with the first sensitivity is more sensitive than with the second sensitivity. A method for setting sensitivity of a touch screen is also provided.

17 Claims, 7 Drawing Sheets

TOUCH SCREEN DISPLAY DEVICE AND APPLICATION THEREOF

RELATED APPLICATIONS

This application claims priority to Taiwan Application Serial Number 97125783, filed Jul. 8, 2008, which is herein incorporated by reference.

BACKGROUND OF THE INVENTION

1. Field of the Invention

The present invention relates to a display device, and more particularly, to a touch screen display device.

2. Description of the Prior Art

Owing to technological development, an increasing number of computers are operatively provided with a second device equipped with a screen, allowing data on the computer body to be accessed through the second device when the computer body is at an OFF state. The second devices are equipped mostly with a touch screen. For those second devices which are removable (from the computer body), the touch screen of each of the second devices is directly exposed from the computer body so as for the touch screen to be operated conveniently. However, the dilemma of the exposed touch screen of the removable second device is whether to leave an opening (which is otherwise filled with the exposed touch screen) in the compute body upon removal of second device therefrom, or to enclose the second device with a casing that inevitably renders operation of the enclosed second device difficult.

Accordingly, there is an urgent need to devise a touch screen display device efficient in its insertion into and separation from a computer.

SUMMARY OF THE INVENTION

In view of this, the objective of the present invention is to provide a touch screen display device insertable into and removable from a connection chamber of a computer, and enable a touch screen of the touch screen display device to demonstrate different sensitivity between an insertion status and a separation status, such that the touch screen display device is easy to operate whether inserted into or removed from the computer.

In a preferred embodiment of the present invention, a touch screen display device comprises a touch screen, a sensor, a control element, and a sensitivity-setting element. The sensor is configured to detect whether the touch screen display device is being inserted in a connection chamber. The control element is electrically connected to the sensor, and is configured to generate a control signal according to an insertion status of the touch screen display device. The sensitivity-setting element is configured to set the touch screen to a first sensitivity or a second sensitivity according to the control signal, wherein the touch screen with the second sensitivity is less sensitive than with the first sensitivity. In another preferred embodiment of the present invention, setting sensitivity of a touch screen comprises the steps of:

(1) detecting if a touch screen is being inserted in a connection chamber;
(2) setting the touch screen to a first sensitivity upon detection that the touch screen is not being inserted in the connection chamber; and
(3) setting the touch screen to a second sensitivity upon detection that the touch screen is being inserted in the connection chamber, wherein the touch screen with the second sensitivity is more sensitive than with the first sensitivity.

In yet another preferred embodiment of the present invention, an electronic device comprises a body, a connection chamber, and a touch screen display device. The connection chamber is provided in the body. The touch screen display device comprises a touch screen, a sensor, a control element, and a sensitivity-setting element. The sensor detects if the touch screen display device is being inserted in the connection chamber. The control element is electrically connected to the sensor and configured to generate an insertion signal upon detection that the touch screen display device is being inserted in the connection chamber. The sensitivity-setting element enhances sensitivity of the touch screen upon receipt of the insertion signal.

BRIEF DESCRIPTION OF THE DRAWINGS

The above and other objectives, features, advantages, and embodiments of the present invention will be best understood by referring to the following detailed description of the accompanying drawings, wherein.

DETAILED DESCRIPTION OF THE EMBODIMENTS

Figure 1:
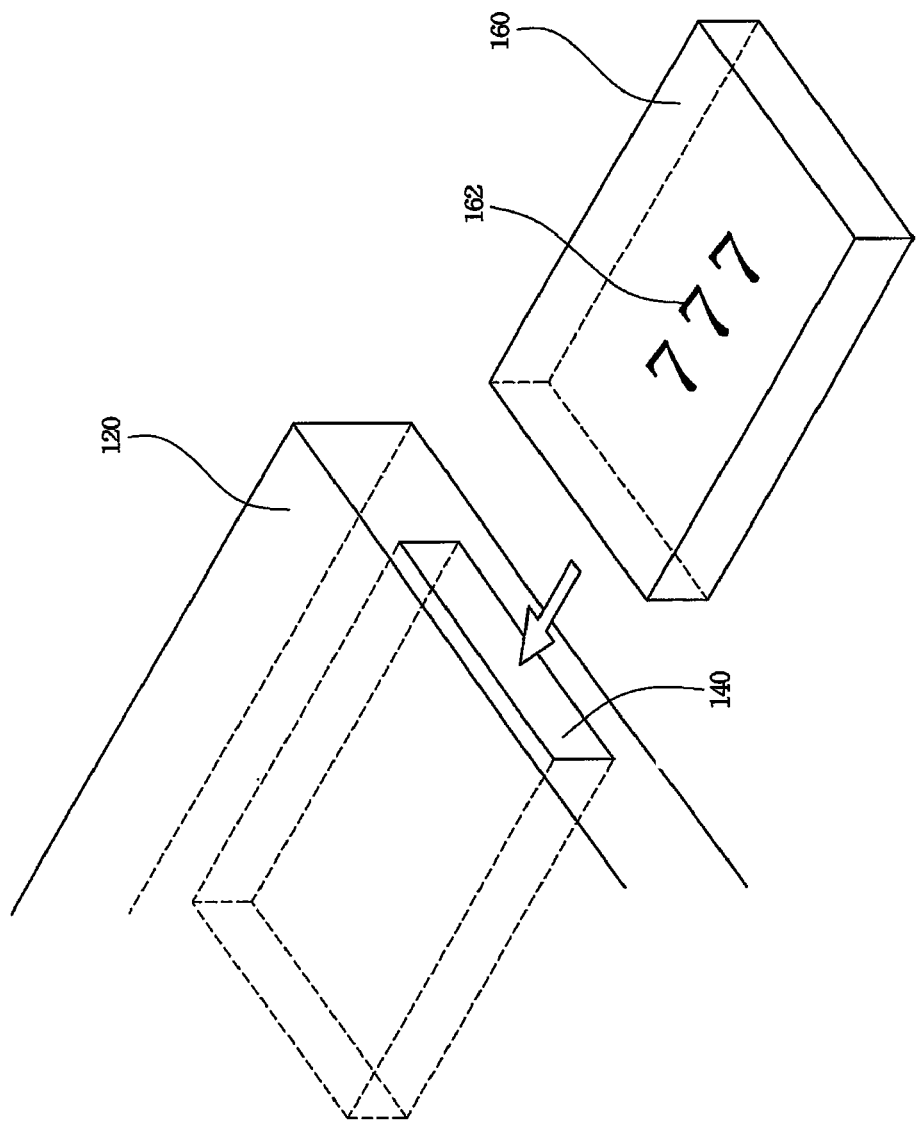
FIG. 1 depicts a schematic view of an electronic device according to a preferred embodiment of the present invention.
Figure 2:
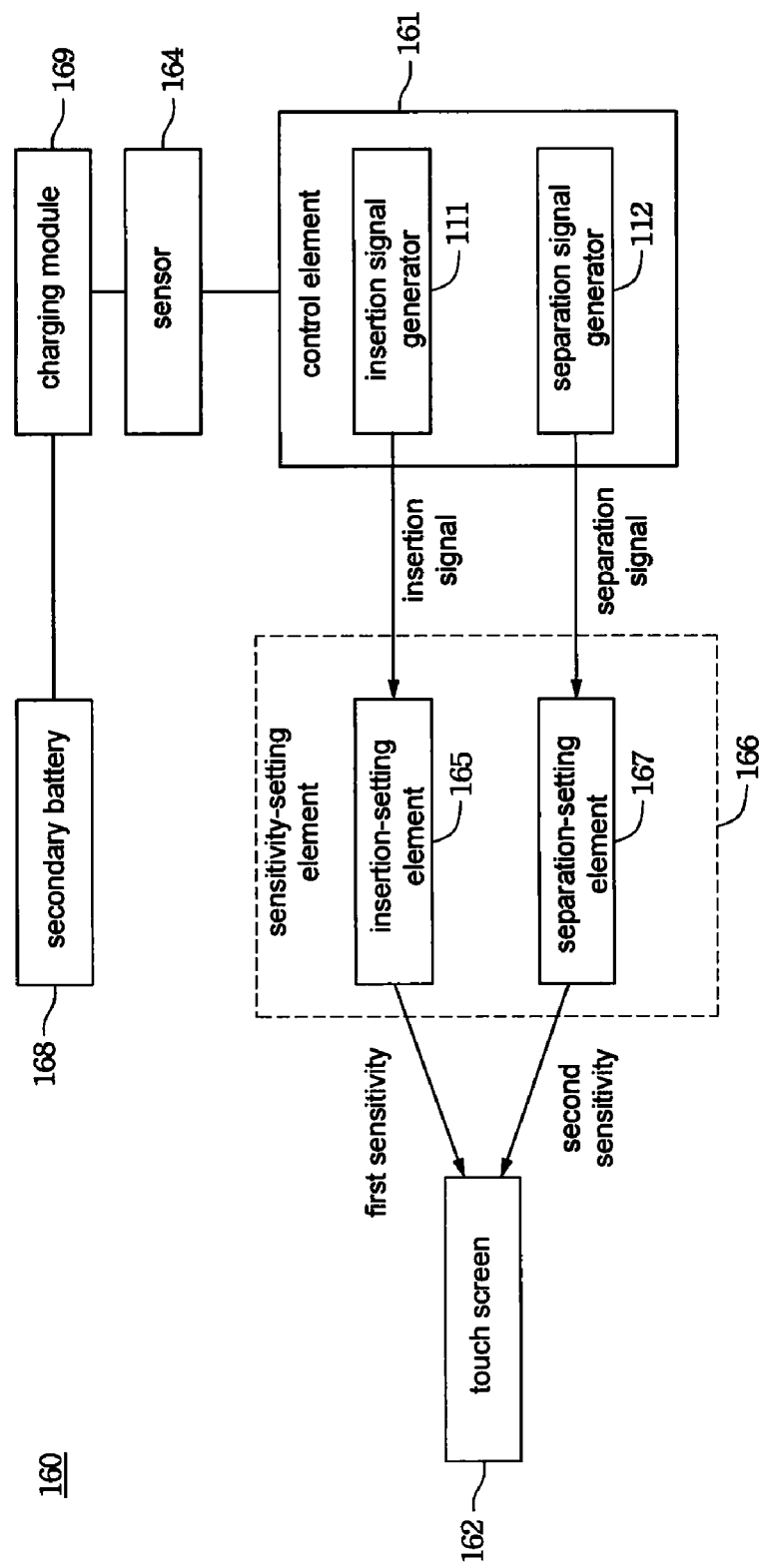
FIG. 2 depicts a function block diagram of a touch screen display device in FIG. 1.

To enable a touch screen display device being inserted in a body to function well, the present invention proposes that sensitivity of a touch screen of the touch screen display device should be adjusted according to an insertion status thereof. For instance, where a touch screen display device has a capacitive touch screen, the sensitivity of the touch screen amounts to the magnitude of a human being's static electricity detectable by the touch screen. In other words, the more sensitive a touch screen is, the lower is the level of a human being's static electricity detectable by the touch screen. FIG. 1 depicts a schematic view of an electronic device according to a preferred embodiment of the present invention. FIG. 2 depicts a function block diagram of a touch screen display device 160 in FIG. 1. Referring to FIG. 1, an electronic device comprises a body 120, a connection chamber 140, and a touch screen display device 160. The connection chamber 140 is provided in the body 120. Referring to FIG. 1 and FIG. 2, a touch screen display device 160 comprises a control element 161, a touch screen 162, a sensor 164, and a sensitivity-setting element 166. The control element 161 is electrically connected to the sensor 164. The sensor 164 is configured to detect if the touch screen display device 160 is being inserted in the connection chamber 140. The control element 161 generates an insertion signal upon detection that the touch screen display device 160 is being inserted in the connection chamber 140. For instance, the control element 161 is a micron process unit, and an insertion signal generated by the control element 161 is an instruction applicable to the I²C Protocol. In the situation where the touch screen display device 160 is being inserted in the connection chamber 140, the touch screen 162 is enclosed and provided inside connection chamber 140. Hence, the static electricity a user transmits to the touch screen 162 via the connection chamber 140 is less than the static electricity transmitted directly to the touch screen 162 when the user touches the touch screen 162. Hence, the sensitivity-setting element 166 is configured to enhance sensitivity of the touch screen 162 upon receipt of the insertion signal. The sensitivity-setting element 166 can be eKT1009 produced by ELAN MICROELECTRONICS CORP or any other control chips capable of adjusting sensitivity of the touch screen 162; in so doing, the sensitivity-setting element 166 enhances sensitivity of the touch screen 162 such that the touch screen display device 160 functions well when inserted into the body 120. From another perspective, the control element 161 enables the sensitivity-setting element 166 to set the touch screen 162 to different degrees of sensitivity according to whether the touch screen display device 160 is being inserted in the connection chamber 140. Hence, the control element 161 comprises an insertion signal generator 111 and a separation signal generator 112. The insertion signal generator 111 is configured to generate an insertion signal upon detection that the touch screen display device 160 is being inserted in the connection chamber 140. The separation signal generator 112 is configured to generate a separation signal upon detection that the touch screen display device 160 is not being inserted in the connection chamber 140. The sensitivity-setting element 166 comprises an insertion-setting element 165 and a separation-setting element 167. The insertion-setting element 165 is configured to set the touch screen 162 to a first sensitivity upon receipt of the insertion signal. The separation-setting element 167 is configured to set the touch screen 162 to a second sensitivity upon receipt of the separation signal. The touch screen 162 with the second sensitivity is less sensitive than with the first sensitivity, thereby allowing the touch screen display device 160 being inserted in the connection chamber 140 to be relatively sensitive.

Figure 3:
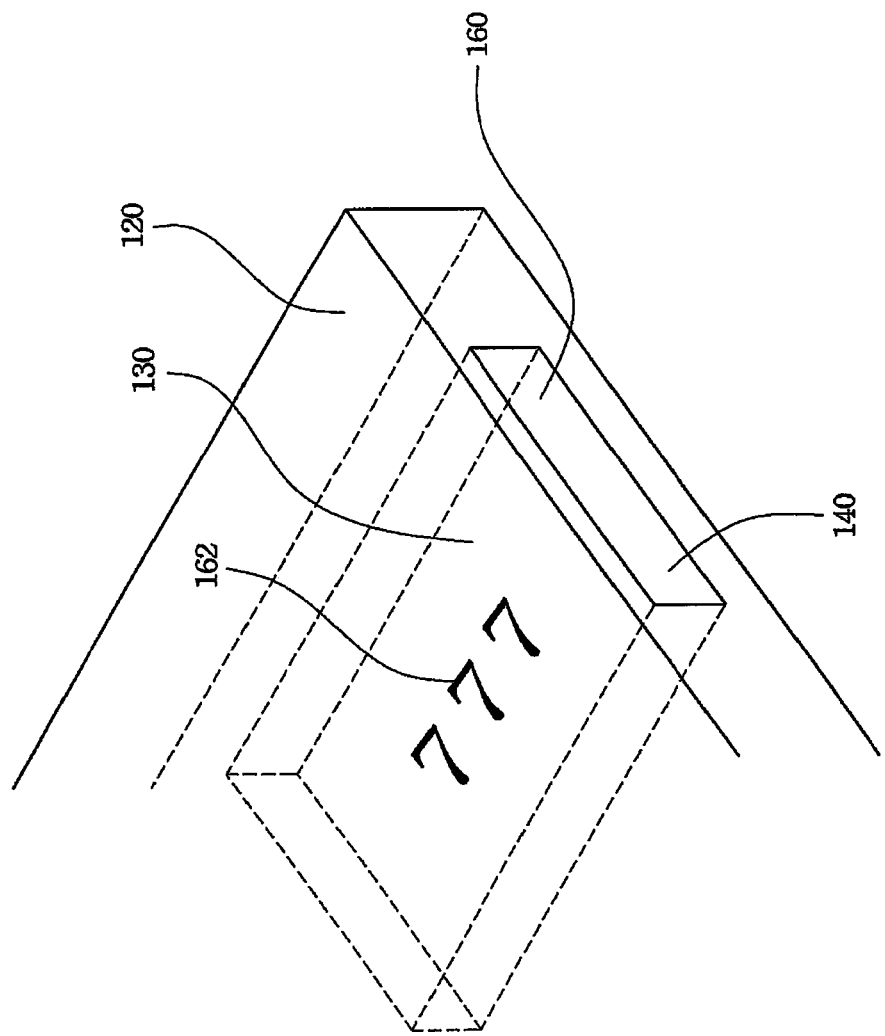
FIG. 3 depicts a schematic view showing the touch screen display device being inserted in a body in FIG. 1.

FIG. 3 depicts a schematic view showing the touch screen display device 160 being inserted in the body 120 in FIG. 1. Referring to FIG. 3, the electronic device comprises a transparent side 130. The transparent side 130 is provided on the body 120. With the touch screen display device 160 being inserted in the connection chamber 140, the transparent side 130 enables the touch screen 162 to be exposed. The transparent side 130 is made of a transparent, non-metallic material, so as to allow a user to touch and operate the touch screen 162 through the transparent side 130. However, operating the touch screen 162 through the transparent side 130 is flawed by deteriorated sensitivity of the touch screen 162. Referring to FIG. 2 and FIG. 3, once the sensor 164 detects that the touch screen display device 160 is being inserted in the connection chamber 140, the sensitivity-setting element 166 will enhance the sensitivity of the touch screen 162. As the touch screen 162 of the touch screen display device 160 is being inserted in the connection chamber 140 demonstrates relatively high sensitivity, the touch screen 162 is operated and operating very well through the transparent side 130.

Likely applications of the touch screen display device 160 being inserted in the connection chamber 140 are described below. Referring to FIG. 1 and FIG. 2, the touch screen display device 160 comprises a secondary battery 168 and a charging module 169. The secondary battery 168 supplies the touch screen display device 160 with power as needed. The charging module 169 charges the secondary battery 168 when the touch screen display device 160 is being inserted in the connection chamber 140.

Figure 4:
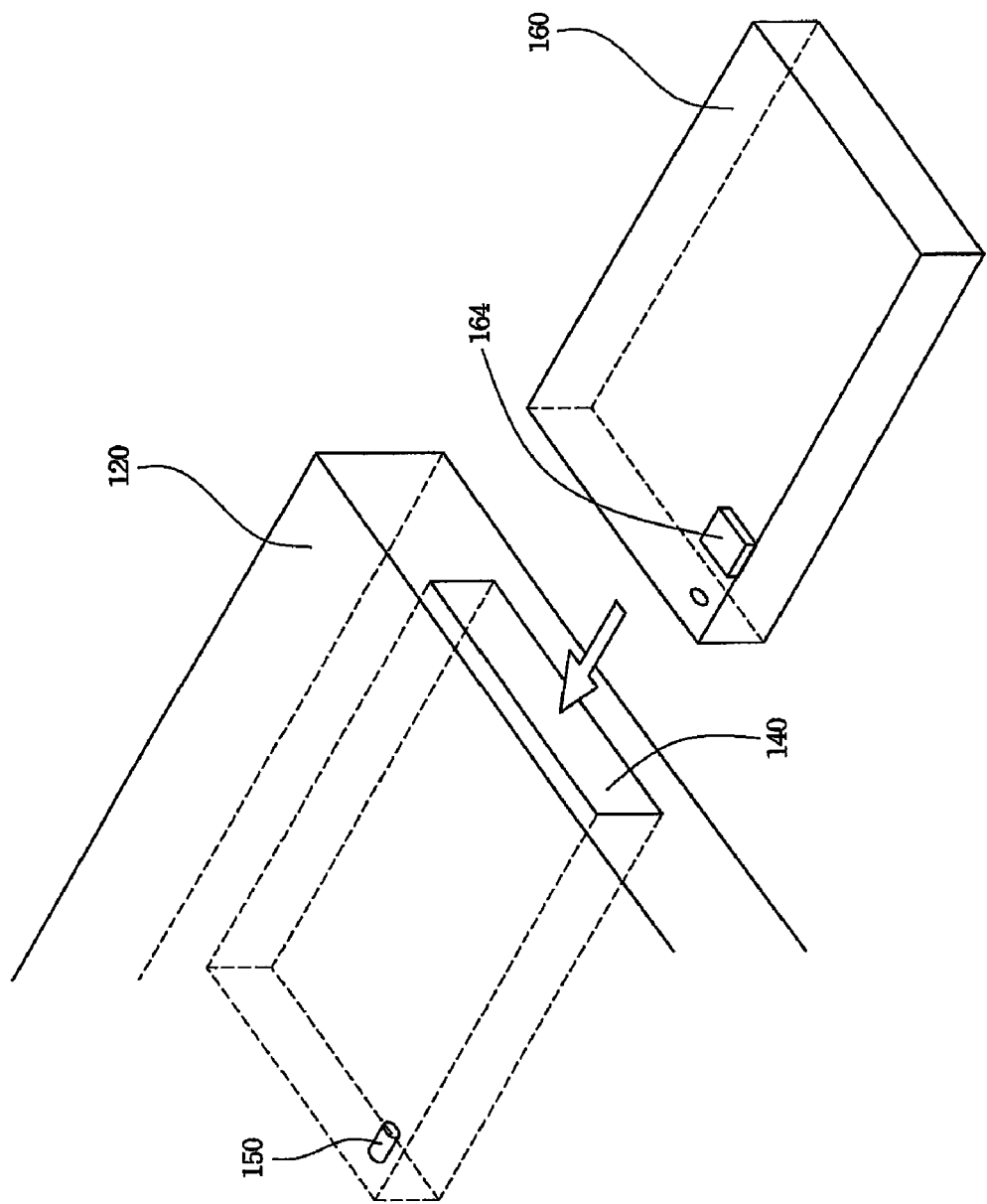
FIG. 4 depicts a preferred embodiment of a sensor in FIG. 2.
Figure 5:
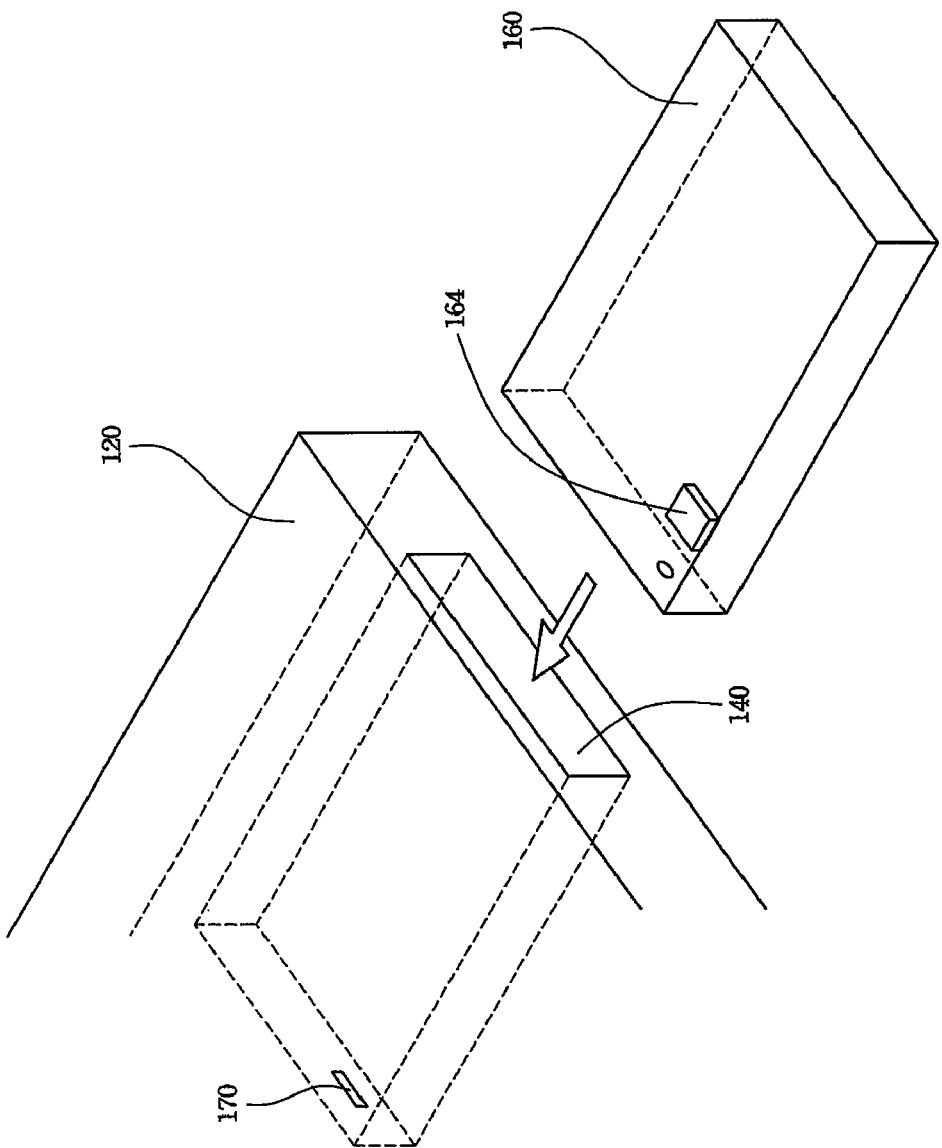
FIG. 5 depicts another preferred embodiment of the sensor in FIG. 2.
Figure 6:
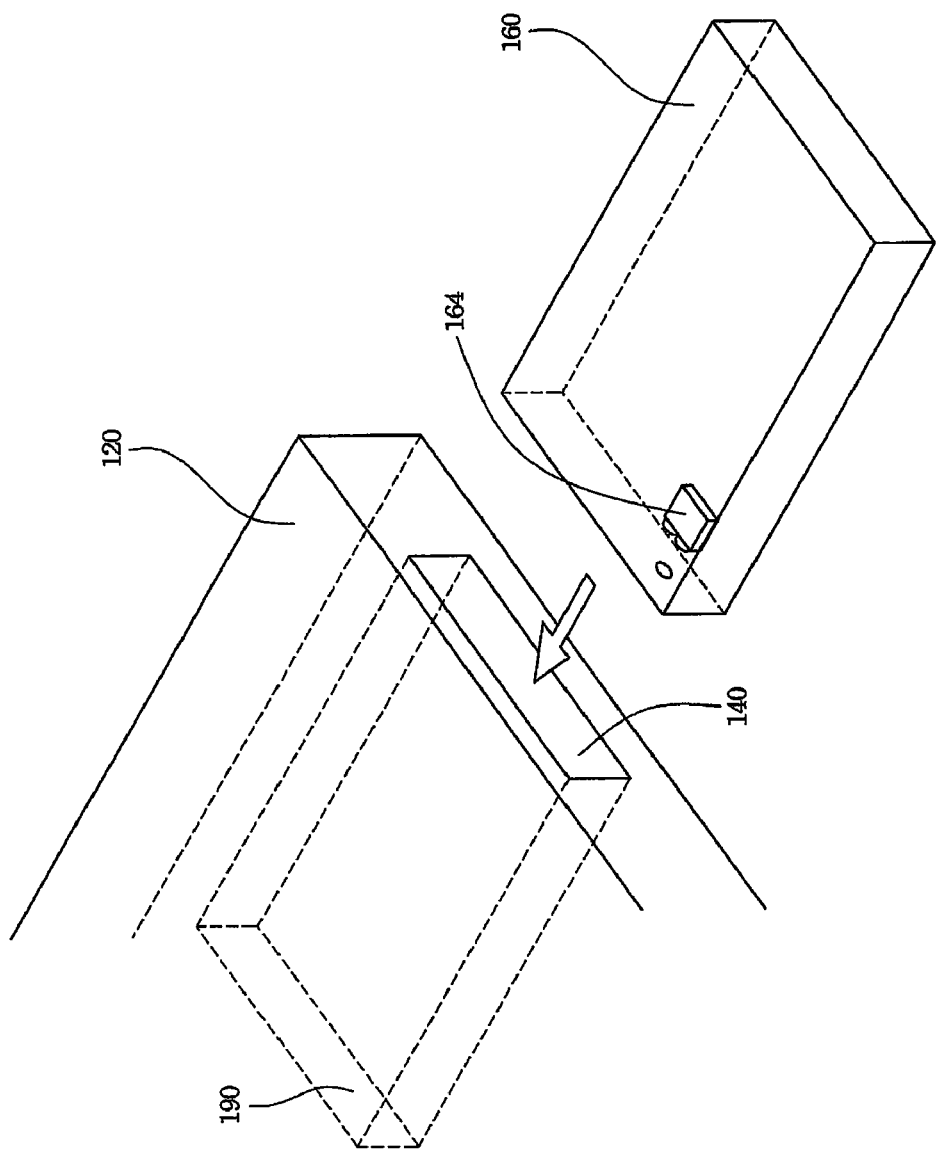
FIG. 6 depicts yet another preferred embodiment of the sensor in FIG. 2.

The sensor 164 in FIG. 2 may have various implementations. Referring to FIG. 4, which depicts a preferred embodiment of the sensor 164 in FIG. 2, the sensor 164 is a tact switch provided on the touch screen display device 160, and the connection chamber 140 is provided with a bolt 150 therein. In the scenario where the touch screen display device 160 is being inserted in the connection chamber 140, the bolt 150 presses the sensor 164, allowing the sensor 164 to determine that the touch screen display device 160 is being inserted in the connection chamber 140. Referring to FIG. 5, which depicts another preferred embodiment of the sensor 164 in FIG. 2, the sensor 164 is a magnet sensor provided on the touch screen display device 160, and the connection chamber 140 is provided with a magnet 170 therein. The sensor 164 determines whether the touch screen display device 160 is being inserted in the connection chamber 140, according to a magnetic detection status. Furthermore, in the scenario where the touch screen display device 160 is being inserted in the connection chamber 140, the magnet 170 changes a magnetic detection status of the sensor 164 so as for the sensor 164 to determine that the touch screen display device 160 is being inserted in the connection chamber 140. Referring to FIG. 6, which depicts a schematic view of yet another preferred embodiment of the sensor 164 in FIG. 2, the sensor 164 is a photointerrupter provided on the touch screen display device 160, and the connection chamber 140 is provided with a light-shielding wall 190 therein. The sensor 164 determines whether the touch screen display device 160 is being inserted in the connection chamber 140, according to a photointerruption state thereof. Moreover, in the scenario where the touch screen display device 160 is being inserted in the connection chamber 140, the light-shielding wall 190 interrupts the light ray falling on the sensor 164, allowing the sensor 164 to determine that the touch screen display device 160 is being inserted in the connection chamber 140.

Figure 7:
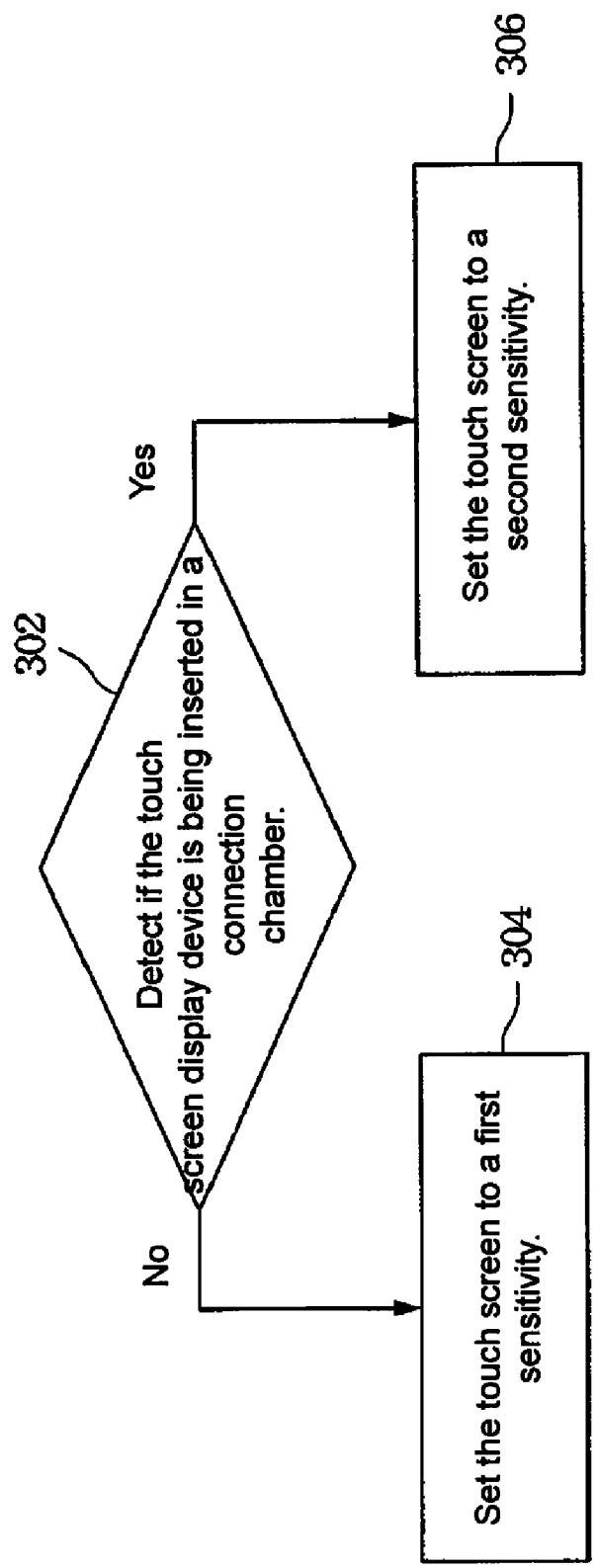
FIG. 7 depicts a flow chart of a method for setting sensitivity of a touch screen according to a preferred embodiment of the present invention.

Referring to FIG. 7, which depicts a flow chart of a method for setting sensitivity of a touch screen according to a preferred embodiment of the present invention. The purpose of the method for setting sensitivity of a touch screen is to set the touch screen to different degrees of sensitivity such that operation of the touch screen remains unaffected whether the touch screen display device 160 is being inserted in the connection chamber 140 or not. It should be understood that, unless otherwise specified, the sequence of the steps described in the preferred embodiments of the present invention is subject to change as needed, wherein the change includes concurrence occurring in whole or in part, and a change in precedence. Referring to FIG. 7 again, the method for setting sensitivity of a touch screen comprises the steps of:

(1) Detecting if a touch screen is being inserted in a connection chamber (step 302).
(2) Setting the touch screen to a first sensitivity upon detection that the touch screen is not being inserted in the connection chamber (step 304).
(3) Setting the touch screen to a second sensitivity upon detection that the touch screen is being inserted in the connection chamber (step 306).

The touch screen with the second sensitivity is more sensitive than with the first sensitivity, and thus the touch screen being inserted in the connection chamber demonstrates relatively high sensitivity without being affected by the connection chamber in which the touch screen is being inserted.

Although the present invention has been disclosed by a plurality of preferred embodiments above, they are not intended to restrict the scope of the present invention. Those skilled in the art can do various alterations and modifications without departing from the spirit and scope of the present invention. Therefore, the scope under the protection of the present invention should be defined by the appended claims.

What is claimed is:

1. A touch screen display device comprising:
   a touch screen;
   a sensor for detecting if the touch screen display device is being inserted in a connection chamber;
   a control element electrically connected to the sensor and configured to generate a control signal according to an insertion status of the touch screen display device; and
   a sensitivity-setting element configured to set the touch screen to a first sensitivity or a second sensitivity according to the control signal, wherein the touch screen with the second sensitivity is less sensitive than with the first sensitivity.

2. The touch screen display device of claim 1, wherein the control element comprises:
   an insertion signal generator for generating an insertion signal upon detection that the touch screen display device is being inserted in the connection chamber; and
   a separation signal generator for generating a separation signal upon detection that the touch screen display device is not being inserted in the connection chamber.

3. The touch screen display device of claim 2, wherein the sensitivity-setting element comprises:
   an insertion-setting element for setting the touch screen to the first sensitivity upon receipt of the insertion signal; and
   a separation-setting element for setting the touch screen to the second sensitivity upon receipt of the separation signal.

4. The touch screen display device of claim 1, further comprising:
   a secondary battery for supplying the touch screen display device with power as needed; and
   a charging module for charging the secondary battery when the touch screen display device is being inserted in the connection chamber.

5. The touch screen display device of claim 1, wherein the sensor is a tact switch.

6. The touch screen display device of claim 1, wherein the sensor is a magnet sensor.

7. The touch screen display device of claim 1, wherein the sensor is a photointerrupter.

8. A method for setting sensitivity of a touch screen of a touch screen display device, wherein the touch screen display device comprises the touch screen and a sensor, and the method comprises the steps of:
   detecting if the touch screen display device is being inserted in a connection chamber of an electronic device utilizing the sensor of the touch screen display device;
   setting the touch screen of the touch screen display device to a first sensitivity upon detection that the touch screen display device is not being inserted in the connection chamber; and
   setting the touch screen of the touch screen display device to a second sensitivity upon detection that the touch screen display device is being inserted in the connection chamber, wherein the touch screen with the second sensitivity is more sensitive than with the first sensitivity.

9. An electronic device comprising:
   a body;
   a connection chamber provided in the body; and
   a touch screen display device comprising:
   a touch screen;
   a sensor for detecting if the touch screen display device is being inserted in the connection chamber;
   a control element electrically connected to the sensor and configured to generate an insertion signal upon detection that the touch screen display device is being inserted in the connection chamber; and
   a sensitivity-setting element for enhancing sensitivity of the touch screen upon receipt of the insertion signal.

10. The electronic device of claim 9, further comprising:
    a transparent side provided on the body and configured to expose the touch screen when the touch screen display device is being inserted in the connection chamber.

11. The electronic device of claim 9, wherein the touch screen display device further comprises:
    a secondary battery for supply the touch screen display device with power as needed; and
    a charging module configured to be electrically connected with the body and the secondary battery so as to charge the secondary battery when the touch screen display device is being inserted in the connection chamber.

12. The electronic device of claim 9, wherein the sensor comprises a tact switch provided on the touch screen display device.

13. The electronic device of claim 12, wherein the sensor further comprises:
    a bolt provided in the connection chamber and configured to press the tact switch when the touch screen display device is being inserted in the connection chamber so as for the sensor to determine that the touch screen display device is being inserted in the connection chamber.

14. The electronic device of claim 9, wherein the sensor comprises a magnet sensor provided on the touch screen display device.

15. The electronic device of claim 14, wherein the sensor further comprises:
    a magnet provided in the connection chamber and configured to change a magnetic detection status of the magnet sensor when the touch screen display device is being inserted in the connection chamber so as for the sensor to determine that the touch screen display device is being inserted in the connection chamber.

16. The electronic device of claim 9, wherein the sensor comprises a photointerrupter provided on the touch screen display device.

17. The electronic device of claim 16, wherein the sensor further comprises a light-shielding wall provided in the connection chamber and configured to interrupt a light ray falling on the photointerrupter when the touch screen display device is being inserted in the connection chamber so as for the sensor to determine that the touch screen display device is being inserted in the connection chamber.

* * * * *